United States Patent
Weber

[15] 3,679,232
[45] July 25, 1972

[54] TRAILER HITCH
[72] Inventor: Charles A. Weber, Elkhart, Ind.
[73] Assignee: Elkhart Welding & Boiler Works, Inc., Elkhart, Ind.
[22] Filed: Jan. 18, 1971
[21] Appl. No.: 107,349

[52] U.S. Cl. ....................................................280/406 A
[51] Int. Cl. .....................................................B62d 53/00
[58] Field of Search...............................280/406 A, 406, 405

[56] References Cited

UNITED STATES PATENTS

| | | | |
|---|---|---|---|
| 3,129,957 | 4/1964 | Bernard et al. | 280/406 A |
| 3,151,879 | 10/1964 | Bock | 280/406 A |
| 3,206,224 | 9/1965 | Bock et al. | 280/406 A |
| 3,347,561 | 10/1967 | Hedgepath | 280/406 A |
| 3,567,251 | 3/1971 | Dalton | 280/406 A |

*Primary Examiner*—Leo Friaglia
*Attorney*—Hobbs & Green and Kemon, Palmer & Estabrook

[57] ABSTRACT

A load equalizing hitch for trailers and the like having a spring bar assembly in which the bar is adjustable angularly in a vertical direction with respect to the ball mount of the hitch, thereby permitting an adjustment of the spring bars relative to one another and to the head to compensate for wear of the hitch parts and fatigue of the spring bars. Each of the two spring bars is adjustable independently of the other and is pivotally connected to the fixture of the assembly. After an adjustment has been made, the spring bar is locked in its adjustable position with respect to the fixture, forming a rigid operative structure.

9 Claims, 7 Drawing Figures

INVENTOR.
CHARLES A. WEBER
BY Hobbs & Green
ATTORNEYS

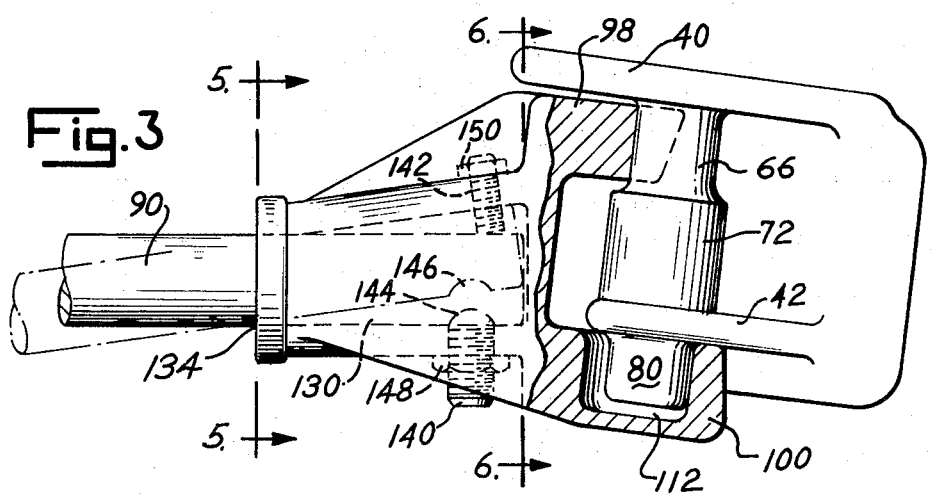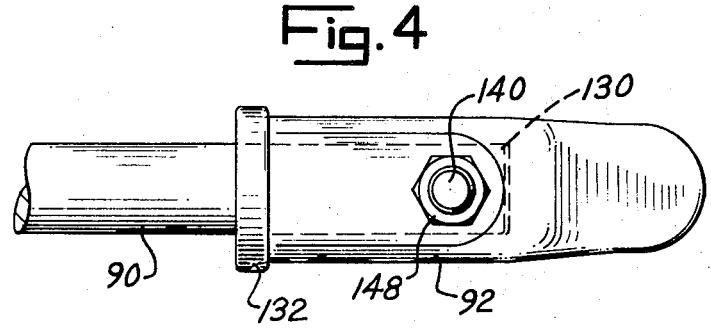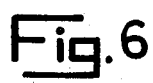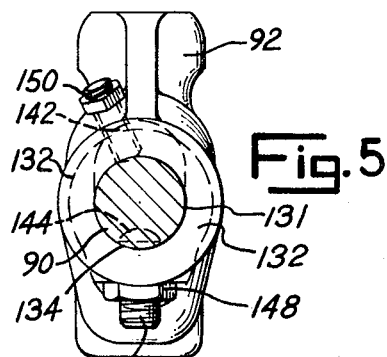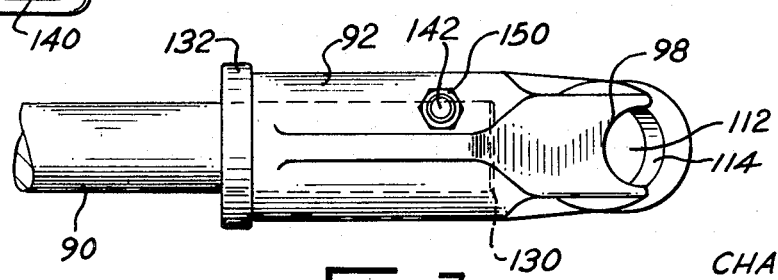

TRAILER HITCH

Mobile homes, house trailers, and similar vehicles normally use a single pair of wheels or a tandem wheel undercarriage located to the rear of the center of the vehicle. With vehicles of substantial length, this places an excessive amount of weight on the rear end of the towing vehicle, and hence the front end of the trailer and the rear part of the towing vehicle sag or dip, placing an undue load on the rear wheels of the towing vehicle and causing the trailer to assume a forwardly tilted position. Various types of devices have been used in the past to overcome this difficulty, a number of which include a single or dual bar attached to the trailer hitch and extending rearwardly from the towing vehicle beneath or along the side of the forward end of the trailer frame. These bars are resilient and are usually connected to the trailer frame by a yieldable coupling means such as a chain, which together permit some flexing to occur between the trailer and towing vehicle at the hitch.

These prior load equalizing mechanisms have had certain inherent difficulties which have rendered them unsatisfactory, inconvenient to install and maintain, and/or even dangerous under certain road conditions or driving maneuvers, including difficulty in locating the head of the hitch at the proper angle with respect to the towing vehicle so that the spring bars will be in proper position along the trailer frame to permit satisfactory adjustment with the spring bar lift at the rear end of the bars. The hitch head or ball mount is normally welded to the tow bar at the desired attitude, and the tow bar is secured to the towing vehicle. If the proper angle of the ball mount is not obtained during the welding operation, or if undue wear occurs in the hitch or fatigue develops in the spring bars, the spring bars cannot be adjusted to the required capacity for equalizing the load between the towed and tractive vehicles. For example, if the welder tilts the ball mount too far forwardly, the required tension could not be obtained by the spring bar lifts, or wear in the spring bar pivot means may likewise prevent the required tension of the spring bars. It is therefore one of the principal objects of the present invention to provide a load equalizing hitch for connecting a trailer to a towing vehicle, in which the vertical angle of the spring bars can be adjusted with respect to the ball mount so that the angle at which the ball mount is attached to the tow bar is not critical, and excessive amount of wear in the spring bar pivot means will not prevent proper adjustment of the spring bars throughout the life of the hitch.

Another object of the invention is to provide a trailer hitch having a load equalizing mechanism therein, which gives maximum adjustability to minimize the effect of human error in installing the hitch and in the wear of the hitch parts, and which permits the hitch to be installed with a wide tolerance range.

Still another object of the invention is to provide a relatively simple, strong and compact trailer hitch having a load equalizing mechanism therein, which can be readily fabricated and assembled and which can be easily installed on an automobile and trailer and thereafter readily adjusted over a wide range of ball mount angles without the use of special tools or equipment.

A further object is to provide a load equalizing mechanism of the aforesaid type, having a pair of readily detachable spring bars pivotally connected at one end to the trailer hitch by a socket construction forming a part of the bars and connected at the other end to the trailer frame by a yieldable adjustable means, which can be readily and accurately adjusted with respect to the ball mount and to one another by one or two simple operations when the hitch is installed and from time to time thereafter as wear occurs in the hitch mechanism and fatigue occurs in one or both of the spring bars.

Additional objects and advantages of the present invention will become apparent from the following description and accompanying drawings, wherein:

FIG. 3 is a fragmentary, partial vertical cross sectional view of the present load equalizing hitch, taken on line 3—3 of FIG. 1;

FIG. 4 is an enlarged bottom view of the fixture used in conjunction with the present load equalizing hitch;

FIG. 5 is an end view of the fixture shown in FIG. 4;

FIG. 6 is a vertical cross sectional view of the fixture shown in FIGS. 4 and 5, taken on line 6—6 of FIG. 3; and FIG. 7 is a top plan view of the fixture.

Figure 1:
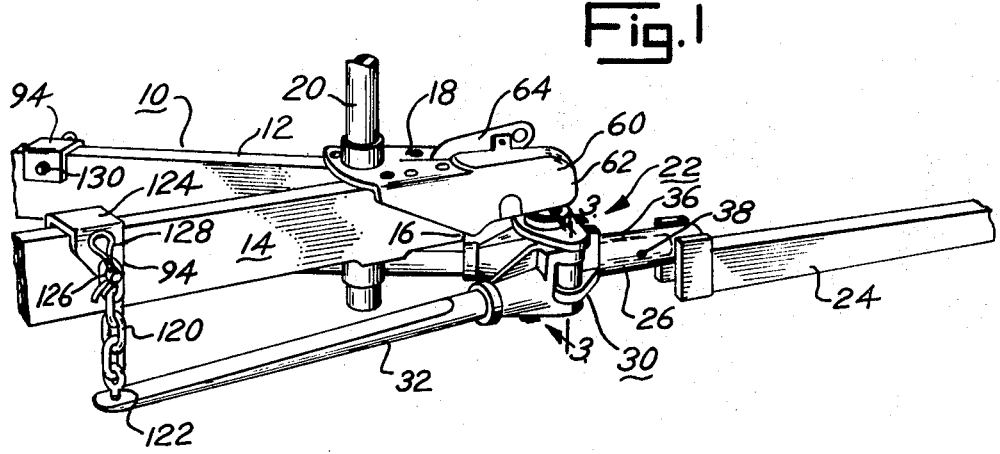
FIG. 1 is a perspective view of a load equalizing trailer hitch embodying the present invention, showing the hitch mounted on a draw bar and connected to the forward frame members of a trailer.

Referring more specifically to the drawings, and to FIG. 1 in particular, numeral 10 designates generally a trailer having angularly positioned frame members 12 and 14, preferably joined together at their forward end 16 by welding. The forward end of the frame members supports a plate 18 for a retractable parking wheel structure partially shown at numeral 20. The load equalizing hitch is shown generally at numeral 22 and is connected to a towing vehicle, such as a conventional automobile, by a draw bar 24, the bar preferably being rigidly bolted at one end to the rear axle of the automobile and supported on the bumper at the other end by any suitable securing means. The rearward end of draw bar 24 includes a releasable attachment means 26 for the hitch. Various types of draw or tow bars may be used in conjunction with the load equalizing hitch; however, the draw or tow bar for larger sized trailers is normally of a type adapted to be secured to the rear axle of the automobile. The trailers on which the present hitch can be mounted may be of various sizes and constructions, and on the majority of the large trailers to which the present hitch is particularly applicable, the frame members are in the angular position shown. For the purpose of the present invention, the draw bar and trailer frame members are considered conventional and of well known construction, and will not be described in detail herein.

The load equalizing hitch embodying the present invention consists principally of ball mount bracket 30, spring bar assembly 32 and spring bar assembly 34. The bracket is constructed of metal and is provided with a cylindrical projection 36, extending forwardly from the bracket and received in attachment means 26, the projection 36 being held in attachment means 26 by a transversely positioned pin 38 extending through both the attachment means and the projection. This pin is readily removable from its position in the attachment means to permit the projection to be withdrawn therefrom when bracket 30 is being removed from the towing vehicle. The projection is welded rigidly to bracket 30, and the desired angular position of the ball mount bracket with respect to the vehicles is obtained by the angle of the bracket on projection 36 when the two parts are welded together, or, as in some assemblies, when the bracket is welded directly to the draw bar.

The ball mount bracket 30 consists of an upper horizontal support plate 40 and lower horizontal support members 42 and 44, the two members being joined rigidly to vertical support members 46 and 48, respectively, the latter two members in turn being joined rigidly to the underside of upper plate 40. This entire hitch bracket is preferably constructed of cast steel with the parts thereof being joined integrally to one another. Upper plate 40 contains a hole for receiving a stem 52 of ball 54, the ball being held rigidly in place by a suitable securing means such as a pin or nut on the lower end of stem 52 beneath plate 40. The hitch bracket 30, together with projection 36 and ball 54, forms the principal part of the towing vehicle part of the present hitch, and can be used in this form in conjunction with conventional type socket means on the trailer, such as that shown at numeral 60, consisting of a cap 62 forming a socket for receiving ball 54 and having a latching mechanism 64 for retaining the ball in the socket while the trailer is being towed by the automobile.

The hitch bracket is provided with upper bearing members 66 and 68 joined rigidly at their upper ends to the underside of plate 40 and to the upper surface of members 42 and 44, respectively, by connecting members 70 and 72. Bearing members 66 and 68 are cylindrical in shape and are somewhat smaller in diameter than members 70 and 72 in order to provide the supporting shoulders 74 and 76 for the spring bar fixture. The hitch is provided with lower bearing members 80 and 82 projecting downwardly from the underside of support members 42 and 44, respectively, and being cylindrical in shape and joined rigidly to the respective support members. The cylindrical bearing members 66 and 80 and bearing members 68 and 82 are in axial alignment and of substantially the same diameter, and are adapted to support one end of the spring bar assemblies 32 and 34.

The two spring bar assemblies 32 and 34 are identical in construction, each consisting of an elongated resilient steel bar 90 and fixture 92 connected to the forward end of spring bar 90. Bar 90 which is connected at the rear end to frame bracket assembly 94, may be of various cross sectional shapes in addition to that shown in the drawings, such as rectangular or round, and may be of various lengths and sizes depending upon the intended installation. Fixture 92 includes a yoke portion 98 and a socket portion 100, the yoke portion defining a U-shaped recess 106 for receiving one of the upper bearing members 66 or 68. The curvature of U-shaped recess 106 is substantially the same as the bearing members, and the recess is smaller than members 70 and 72 so that the lower edge 108 of yoke 98 will seat on and be supported by shoulder 74 or 76. Socket portion 100 consists of an outer wall 110 spaced downwardly from yoke 98 and defining an elongated recess 112, the elongation of the recess being parallel with the spring bar and the wall 114 at the forward end of the recess forming a bearing surface for engaging the forward side of lower bearing members 80 or 82.

The spring bar assembly is mounted on the hitch bracket in the manner illustrated in FIG. 3 with the inner surface of U-shaped recess 106 engaging the rear side of upper bearing member 66 or 68, and the forward side 114 of the wall defining recess 112 engaging the forward side of lower bearing member 80 or 82. In assembling the spring bar, socket portion 100 is first slipped upwardly onto lower bearing member 80 or 82 while the spring bar is tilted downwardly sufficiently to maintain the yoke and the upper bearing member in spaced relation. After the socket portion has been moved upwardly against support member 42 or 44, the spring bar is then tilted upwardly to place the yoke 98 around upper bearing member 66 or 68 with the rear surface of the latter bearing member against the inner surface of U-shaped recess 106. In order to remove the spring bar assembly from the hitch bracket, the reverse operation is performed.

Figure 2:
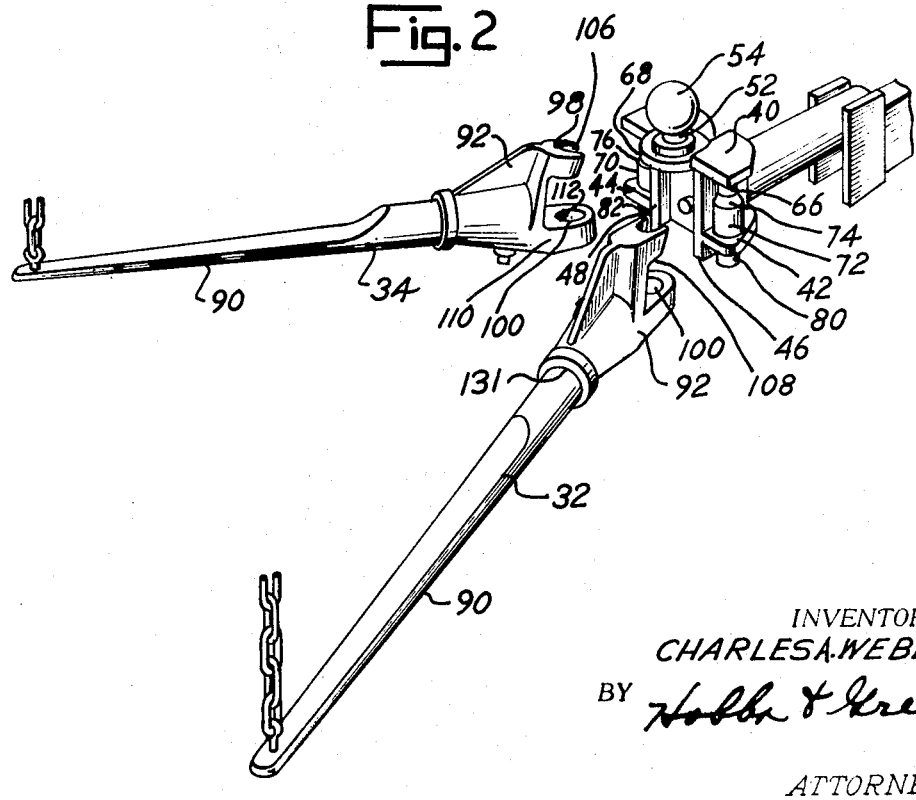
FIG. 2 is a perspective view of the load equalizing hitch shown in FIG. 1, with certain parts thereof disassembled.

After the spring bar assembly has been mounted on the hitch bracket in the foregoing manner, the rear or free end thereof is attached by a yieldable frame bracket assembly 94, the one shown in FIGS. 1 and 2 consisting of a chain 120 attached to the end of the spring bar by a bolt and eye 122 and a U-shaped bracket 124 placed over the upper edge of the respective frame member and having an outwardly projecting pin 126 for receiving the proper link of chain 120. The chain is held in place on pin 126 by a cotter key 128 or the like. Preferably, bracket 124 is held in place by a set screw 130 or a pin extending through the two arms of bracket 124 and through the frame member. A lift mechanism or bracket may be used in place of bracket 124 in order to obtain the desired amount of tension on the bars. A suitable lift bracket is disclosed in Design Pat. No. D 213,616, and it is used with chain 120. The amount of tension on the spring bars can be varied by selecting different links in chain 120 for pin 126. When the proper adjustment has been made, the frame members 12 and 14 and draw bar 24 are substantially horizontal and parallel to one another.

In order to compensate for maladjustment of hitch 22 on the draw bar and for undue wear in the moving parts of the hitch or fatigue of the spring bars, an adjustment mechanism is included in fixture 92 of each spring bar assembly, thus permitting each bar to be adjusted individually in accordance with requirements. In the embodiment illustrated in the drawings the forward end of bar 90 is seated in a socket 130 in the fixture. The socket is generally of a width substantially the same as the thickness of the bar 90 and of a height substantially greater near the forward end than at the opening 131 through which the bar extends. The part of the fixture shown at collar 132, through which the bar extends, forms, in effect, a pivot point 134 which permits the forward end of the bar to move upwardly and downwardly, with the rearward end of the bar moving upwardly and downwardly in the opposite direction in a greater amount. The desired vertical adjustment is obtained by a pair of set screws 140 and 142, screw 140 having a rounded end 144 which seats in a rounded recess 146 in the end of the bar. The two screws are threaded into their respective holes in the fixture and are adjusted upwardly or downwardly when an adjustment is to be made. For example, if more tension is to be placed on the bar by the adjustment, the forward end of the bar, i.e., the portion projecting inwardly into socket 130 in the fixture, is adjusted upwardly by set screw 140 after set screw 142 has been retracted. This results in a downward tilting of the spring bar rearwardly from pivot point 134, i.e., the elongated exposed part of the bar. After an adjustment has been made by tightening screw 140, set screw 142 is then tightened to hold the bar rigidly in place, with the upper end 144 of screw 140 seated in recess 146. After the two screws have been adjusted to provide the proper angularity of the bar with respect to the fixture and ball mount, the screws are locked by nuts 148 and 150, respectively. The screws permit the bar to be adjusted over a wide range and, after the adjustment has been made, they effectively retain the bar rigidly in place in the fixture so that the fixture and bar function as a unitary structure. Since the wear involving the two bars and the fatigue which may occur during the normal life of the spring bars are often not the same, the individual adjustment for the two bars provides maximum accuracy in obtaining the required equalization of spring bar tension on opposite sides of the trailer frame. Likewise, if the two spring bars should initially have a different strength, the two bars can be adjusted to equalize this difference and thereby obtain maximum equalization on opposite sides, to increase the safety and reliability of the hitch.

After the hitch has been assembled on the towing and towed vehicles in the manner previously described herein, and the two spring bars adjusted to provide substantially equal load transferring characteristics between the towed and the towing vehicles, the hitch operates over extended periods of time without requiring adjusting.

While only one embodiment of the present hitch mechanism has been described in detail herein, various changes may be made in the type of adjustment mechanism between the spring bar and assembly fixture or ball mount, and the spring bar assembly can be adapted to other types and makes of load equalizing trailer hitches.

I claim:

1. In a load equalizing hitch having a ball mount bracket, two angularly positioned spring bar assemblies, and frame bracket assemblies for supporting the rear end of the spring bars: each of said spring bar assemblies comprising a spring bar, a fixture for connecting said spring bar to the ball mount bracket, and means for adjusting, in the vertical direction, the angularity of the bar with respect to the ball mount bracket.

2. A spring bar assembly for a load equalizing hitch as defined in claim 1 in which said fixture includes a part for receiving the end of said bar, and pivot means on said fixture near the forward end of said bar.

3. A spring bar assembly for a load equalizing hitch as defined in claim 2 in which said adjustment means includes a set screw.

4. A spring bar assembly for a load equalizing hitch as defined in claim 2 in which said adjustment means includes a pair of set screws for pivoting said bar on said pivot means and for locking said bar in an adjusted position.

5. A spring bar assembly for a load equalizing hitch as defined in claim 1 in which said fixture consists of a body having a socket opening to the rear receiving one end of said bar and extending vertically above and below said bar, the part of said fixture defining said opening forming a pivot point for said bar means in said body for tilting the bar.

6. A spring bar assembly for a load equalizing hitch as defined in claim 5 in which said adjustment means for tilting said bar includes a set screw.

7. A spring bar assembly for a load equalizing hitch as defined in claim 5 in which said adjustment means includes a pair of opposed set screws arranged vertically to one another for adjusting the bar angularly and locking the bar in an adjusted position.

8. A spring bar assembly for a load equalizing hitch as defined in claim 6 in which a recess is provided in the corresponding end of said bar for receiving the inner end of said set screw.

9. A spring bar assembly for a load equalizing hitch as defined in claim 7 in which said fixture is constructed of steel and said set screws are threaded into the body of said fixture with one set screw in the lower portion thereof and the other set screw in the upper portion thereof.

* * * * *